(12) United States Patent
Tkachuk et al.

(10) Patent No.: US 8,504,997 B2
(45) Date of Patent: Aug. 6, 2013

(54) ENVIRONMENT DATA REFINEMENT BASED ON STATIC ANALYSIS AND SYMBOLIC EXECUTION

(75) Inventors: Oksana Tkachuk, Palo Alto, CA (US); Indradeep Ghosh, San Jose, CA (US); Sreeranga P. Rajan, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 1095 days.

(21) Appl. No.: 12/407,695

(22) Filed: Mar. 19, 2009

(65) Prior Publication Data
US 2010/0242029 A1    Sep. 23, 2010

(51) Int. Cl.
*G06F 9/44*    (2006.01)

(52) U.S. Cl.
USPC ............................ 717/131; 717/124; 717/126

(58) Field of Classification Search
None
See application file for complete search history.

(56) References Cited

U.S. PATENT DOCUMENTS

| | | | |
|---|---|---|---|
| 5,317,740 A | 5/1994 | Sites | |
| 6,938,186 B2 * | 8/2005 | Das et al. | 714/38.1 |
| 7,168,009 B2 * | 1/2007 | Darringer et al. | 717/126 |
| 7,584,455 B2 * | 9/2009 | Ball | 717/124 |
| 7,661,097 B2 * | 2/2010 | Mukkavilli | 717/143 |
| 7,681,180 B2 * | 3/2010 | de Halleux et al. | 717/124 |
| 7,844,951 B2 * | 11/2010 | Chen et al. | 717/124 |
| 7,861,226 B1 | 12/2010 | Episkopos et al. | 717/124 |
| 7,873,945 B2 * | 1/2011 | Musuvathi et al. | 717/124 |
| 7,886,272 B1 | 2/2011 | Episkopos et al. | 717/124 |
| 7,926,039 B2 | 4/2011 | Wang et al. | 717/126 |
| 7,945,898 B1 | 5/2011 | Episkopos et al. | |
| 8,185,881 B2 * | 5/2012 | Brand et al. | 717/131 |
| 8,271,953 B2 * | 9/2012 | Prasad et al. | 717/126 |
| 8,286,140 B2 | 10/2012 | Sadowsky | |
| 8,302,080 B2 * | 10/2012 | Wassermann et al. | 717/131 |
| 8,402,440 B2 * | 3/2013 | Sankaranarayanan et al. | 717/126 |
| 2003/0226060 A1 * | 12/2003 | Das et al. | 714/38 |
| 2004/0117772 A1 * | 6/2004 | Brand et al. | 717/132 |
| 2005/0066234 A1 * | 3/2005 | Darringer et al. | 714/38 |
| 2005/0262456 A1 | 11/2005 | Prasad | |
| 2006/0247907 A1 | 11/2006 | Qadeer et al. | 703/22 |
| 2006/0253739 A1 * | 11/2006 | Godefroid et al. | 714/38 |
| 2007/0033576 A1 | 2/2007 | Tillmann et al. | 717/124 |

(Continued)

OTHER PUBLICATIONS

Tkachuk et al., "Combining Environment Generation and Slicing for Modular Software Model Checking", 2007 ACM, ASE'07, Nov. 5-9, 2007, pp. 401-494; <http://dl.acm.org/citation.cfm?doid=1321631.1321694.*

(Continued)

*Primary Examiner* — Thuy Dao
*Assistant Examiner* — Ben C Wang
(74) *Attorney, Agent, or Firm* — Baker Botts L.L.P.

(57) ABSTRACT

In particular embodiments, an environment for modular software analysis is generated for a software module under analysis. Irrelevancy analysis is performed on the software module to determine that, for each input datum to the software module, whether the input datum is relevant or irrelevant with respect to branch coverage of the module code. A default concrete value is assigned to each irrelevant input datum. A set of concrete values is calculated for each relevant input datum using symbolic execution. The environment is enhanced such that default concrete values are passed to the software module for the irrelevant input data and sets of concrete values generated using symbolic execution are passed to the software module for the relevant input data. The enhanced environment enables module analysis with as much as 100% branch coverage of the module code.

28 Claims, 3 Drawing Sheets

(56) References Cited

U.S. PATENT DOCUMENTS

| | | | |
|---|---|---|---|
| 2007/0168988 A1* | 7/2007 | Eisner et al. | 717/126 |
| 2008/0016497 A1* | 1/2008 | Wang et al. | 717/124 |
| 2008/0082968 A1 | 4/2008 | Chang et al. | 717/128 |
| 2008/0320451 A1* | 12/2008 | Brand et al. | 717/132 |
| 2009/0089757 A1* | 4/2009 | Rajan et al. | 717/124 |
| 2009/0089759 A1 | 4/2009 | Rajan et al. | 717/126 |
| 2009/0125976 A1* | 5/2009 | Wassermann et al. | 726/1 |
| 2009/0228871 A1* | 9/2009 | Edwards et al. | 717/128 |
| 2009/0235235 A1 | 9/2009 | Prasad et al. | |
| 2009/0265692 A1* | 10/2009 | Godefroid et al. | 717/128 |
| 2010/0005454 A1 | 1/2010 | Sankaranarayanan et al. | 717/127 |
| 2010/0083233 A1 | 4/2010 | Vanoverberghe et al. | 717/126 |
| 2010/0125832 A1* | 5/2010 | Prasad et al. | 717/124 |
| 2010/0223599 A1* | 9/2010 | Ghosh et al. | 717/130 |
| 2010/0281460 A1 | 11/2010 | Tillmann et al. | 717/106 |
| 2010/0287534 A1 | 11/2010 | Vangala et al. | 717/124 |
| 2010/0313187 A1* | 12/2010 | Tan et al. | 717/131 |
| 2011/0016356 A1* | 1/2011 | Artzi et al. | 717/131 |
| 2011/0016456 A1* | 1/2011 | Artzi et al. | 717/131 |
| 2011/0016457 A1* | 1/2011 | Artzi et al. | 717/131 |
| 2011/0072417 A1* | 3/2011 | Dhurjati et al. | 717/124 |
| 2011/0283147 A1 | 11/2011 | Prasad et al. | |
| 2011/0289488 A1* | 11/2011 | Ghosh | 717/131 |
| 2012/0017119 A1 | 1/2012 | Ghosh et al. | |
| 2012/0017200 A1 | 1/2012 | Ghosh et al. | |
| 2012/0084609 A1 | 4/2012 | Tkachuk et al. | |
| 2012/0110580 A1 | 5/2012 | Ghosh et al. | |
| 2012/0110589 A1 | 5/2012 | Ghosh et al. | |
| 2012/0110590 A1 | 5/2012 | Ghosh et al. | |
| 2012/0110591 A1 | 5/2012 | Ghosh et al. | |
| 2012/0192150 A1 | 7/2012 | Li et al. | |
| 2012/0192162 A1 | 7/2012 | Li et al. | |
| 2012/0192169 A1 | 7/2012 | Li et al. | |
| 2012/0204154 A1* | 8/2012 | Li et al. | 717/124 |
| 2012/0311545 A1 | 12/2012 | Li et al. | |

OTHER PUBLICATIONS

Alkhalaf et al., "ViewPoints: Differential String Analysis for Discovering Client- and Server-Side Input Validation Inconsistencies", 2012 ACM, ISSTA'12, Jul. 15-20, 2012, Minneapolis, MN, USA, pp. 1-11; <http://dl.acm.org/citation.cfm?doid=2338965.2336760>.*

Li et al., "KLOVER: A Symbolic Execution and Automatic Test Generation Tool for C++ Programs", 23rd International Conference on Computer Aided Verification CAV 2011, Jul. 14-20, 2011, pp. 1-6; <http://www.cs.utah.edu/~ligd/publications/KLOVER-CAV11.pdf>.*

Saxena et al., "A Symbolic Execution Framework for JavaScript", 2010 IEEE, pp. 513-528; <http://ieeexplore.ieee.org/stamp/stamp.jsp?tp=&arnumber=5504700>.*

Jovanovic et al., "Pixy: A Static Analysis Tool for Detecting Web Application Vulnerabilities", 2006 IEEE, pp. 1-6; <http://ieeexplore.ieee.org/stamp/stamp.jsp?tp=&arnumber=1624016>.*

Anand et al., "Type-dependence Analysis and Program Transformation for Symbolic Execution," College of Computing, Georgia Institute of Technology, Lecture Notes in Computer Science, vol. 4424, Jul. 5, 2007.

Khurshid et al., "Generalizing Symbolic Execution to Library Classes," *ACM Sigsoft Software Engineering Notes*, vol. 31(1), Jan. 2006.

U.S. Appl. No. 12/785,756, May 24, 2010.

Request for Continued Examination Transmittal for U.S. Appl. No. 12/785,756, Nov. 1, 2012.

USPTO Notice of Allowance and Fees Due for U.S. Appl. No. 12/785,756, Nov. 19, 2012.

Patil, S. et al., "*A Parallel Branch and Bound Algorithm for Test Generation*", 26th ACM/IEEE Design Automation Conference, Paper 23.1, 1989 ACM 0-89791-310-8/89/0006/0339, pp. 339-344, 1989.

Corbett, James C., et al., "*Bandera: Extracting Finite-state Models from Java Source Code*", Proceedings of the 22nd International Conference on Software Engineering (ICSE '00, ACM, pp. 439-448, 2000.

Lin, Jin-Cherng et al., "*Using Genetic Algorithms for Test Case Generation in Path Testing*", 2000 IEEE, pp. 241-246, 2000.

Lhoták, Jennifer, et al., "*Integrating the Soot compiler infrastructure into an IDE*", McGill University School of Computer Science, Sable Research Group, Sable Technical Report No. 2003-4, 15 pages, Oct. 16, 2003.

Li, X., et al., "*Interprocedural Program Analysis for Java based on Weighted Pushdown Model Checking*", The 5th International Workshop on Automated Verification of Infinite-State Systems (AVIS 2006), ETAPS, pp. 1-13, Apr. 2006.

Li, X., et al., "*Context-Sensitive Relevancy Analysis for Efficient Symbolic Execution*", APLAS 2008, LNCS 5356, Springer-Verlag, Berlin Heidelberg, pp. 36-52, 2008.

Li, X., "*Static Program Analysis for Software Validation*", Japan Advanced Institute of Science and Technology, 21st Century COE Symposium 2008, Verifiable and Evolvable e-Society, 5 pages, Mar. 4, 2008.

Bucur, Stefan, "*Scalable Automated Testing Using Symbolic Execution*", DSLAB, I&C, EPFL, EDIC Research Proposal, pp. 1-8, May 5, 2009.

Li, G., et al., "*KLOVER: A Symbolic Execution and Automatic Test Generation Tool for C++ Programs*", 23rd International Conference on Computer Aided Verification, CAV 2011, p. 1-6, Jul. 14-20, 2011.

USPTO Nonfinal Office Action for U.S. Appl. No. 12/395,515, Aug. 16, 2012.

USPTO Ex Parte Quayle Action for U.S. Appl. No. 12/785,756, Apr. 26, 2012.

Response to Ex Parte Quayle Action for U.S. Appl. No. 12/785,756, Jun. 21, 2012.

USPTO Notice of Allowance and Fees Due for U.S. Appl. No. 12/785,756, Aug. 3, 2012.

Ratsaby, Gil, et al., "*Improvements in Coverability Analysis*", Springer-Verlag Berlin Heidelberg 2002, FME 2002, LNCS 2391, pp. 41-56, 2002.

Khor, Susan, et al., "*Using a Genetic Algorithm and Formal Concept Analysis to Generate Branch Coverage Test Data Automatically*", Proceedings of the 19th International Conference on Automated Software Engineering (ASE '04), IEEE, 2004, 4 pages, 2004.

Majumdar, Rupak, et al., "*Directed Test Generation using Symbolic Grammars*", ACM 2007, ESEC/FSE '07, Croatia, pp. 553-556, Sep. 3-7, 2007.

Shannon, D., et al., "*Efficient Symbolic Execution of Strings for Validating Web Applications*", DEFECTS '09, 2009 ACM, pp. 22-26, Jul. 19, 2009.

Person, Suzette, et al., "*Directed Incremental Symbolic Execution*", PLDI '11, 2011 ACM, San Jose, California, 12 pages, Jun. 4-8, 2011.

Baars, Arthur et al., "*Symbolic Search-Based Testing*", 2011 IEEE, ASE 2011, Lawrence, Kansas, pp. 53-62, 2011.

Godefroid, Patrice, "*Test Generation Using Symbolic Execution*", 2012 Microsoft Research, Leibniz International Proceedings in Informatics, pp. 1-10, 2012.

USPTO, Notice of Allowance and Fees Due for U.S. Appl. No. 12/785,756, filed May 24, 2010 by Indradeep Ghosh, 12 pages, Mar. 4, 2013.

* cited by examiner

ENVIRONMENT DATA REFINEMENT BASED ON STATIC ANALYSIS AND SYMBOLIC EXECUTION

TECHNICAL FIELD

The present disclosure generally relates to software analysis.

BACKGROUND

Software analysis is a common concern among developers. Various techniques can be used to perform software analysis: testing, static analysis, and model checking. Due to complexity of modern software, the above techniques often rely on reduction techniques such as applying analysis to selected parts of the program, called module under analysis. Instead of analyzing the software in its entirety all at once, modular analysis analyzes only one or more modules of the software at a time. To analyze a module in isolation, one needs to model the module's environment, consisting of components with which the module interacts. Once the environment model is generated, it can be combined with the code of the module under analysis, and testing or model checking techniques can be applied to the whole system to check module properties stated as assertions or using a specification language of the underlying analysis technique.

Environment generation is a challenging problem, at least in part because the environment may influence multiple aspects of the behavior of the module being analyzed. Environment may influence the module's control (e.g., by invoking the module's methods) and data (e.g., by passing data to the module). Environment model should be general enough to cover interesting module behaviors and uncover errors, yet restrictive enough to enable tractable analysis, without being overly restrictive, which may cause the analysis to miss important behaviors and mask errors. To evaluate the quality of environment, various metrics can be used. One popular metric is branch coverage. A high quality environment will enable modular software analysis to uncover errors or, in the case of no errors, will produce high branch coverage over the module code.

DESCRIPTION OF EXAMPLE EMBODIMENTS

In particular embodiments, environment generation, static analysis, and symbolic execution are combined to enable analysis of individual modules within a software system. An environment is generated in which a software module under analysis is to be tested. The environment may include one or more drivers, components that make calls to the module, or one or more stubs, simplified implementations of components called by the module. Some of the drivers or stubs provide inputs to the software module under analysis. Initially, all inputs to the module under analysis are symbolic inputs, e.g., using symbols as input values to the module under analysis. The goal of the above techniques is to calculate concrete input values to maximize branch coverage of the module code.

In particular embodiments, static analysis, and more specifically, irrelevancy analysis is performed on each of the inputs of the module under analysis. If an input affects a branching operation in the module, it is considered a relevant input. Conversely, if an input does not affect any branching operation in the module, it is considered an irrelevant input. The relevant inputs retain their symbols as input values. The irrelevant inputs are assigned default concrete values as input values.

Particular embodiments perform symbolic execution on the module. For each of the inputs that has a symbolic input value, a set of concrete values is calculated as to maximize branch coverage of the module code. The concrete values are used as input values to the module under analysis for the relevant input. Since irrelevant inputs do not influence branch coverage, they can be assigned a single, default, value. Since relevant inputs influence branch coverage, then a set of concrete values, one concrete value per possible module execution, needs to be calculated for each relevant value. Symbolic execution is used to calculate possible concrete values for each symbolic value, to enable as much as 100% branch coverage, when testing the module.

Modular analysis may be performed on the software module under analysis by testing and verifying the module within the enhanced environment.

In particular embodiments, to perform modular software analysis, an environment is generated in which a software module under analysis may be tested and verified. The environment may include one or more drivers or stubs. Some of these drivers or stubs supply inputs to the module under analysis. Selecting the appropriate input data to the software module under analysis may directly or indirectly affect the results of the modular analysis.

Figure 1:
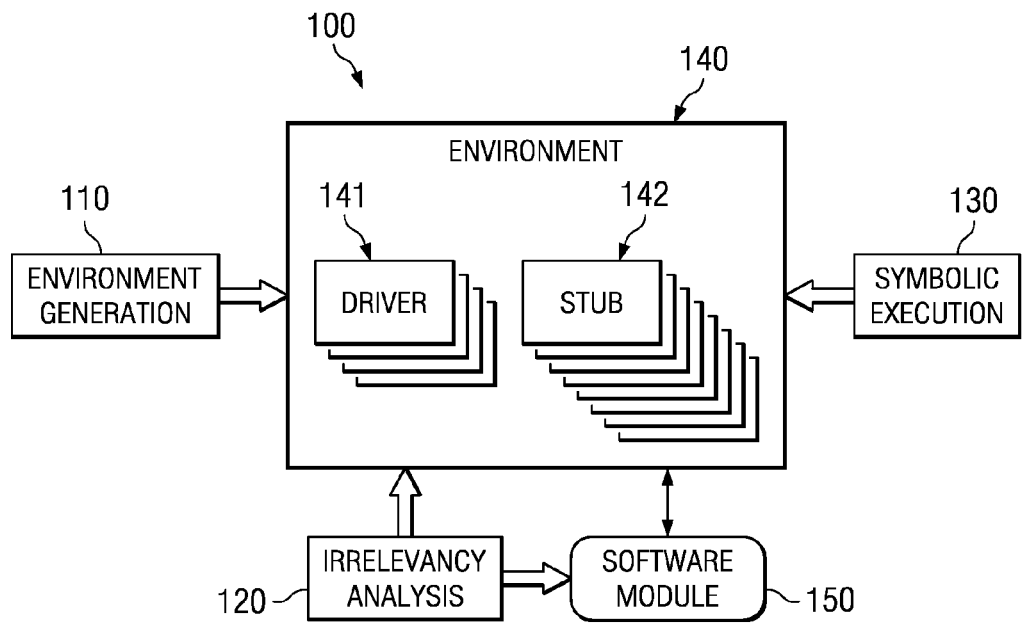
FIG. 1 illustrates an example system for constructing an enhanced environment for modular software analysis.

FIG. 1 illustrates an example system 100 for constructing an enhanced environment for modular software analysis. The system 100 contains several components. The environment generation component 110 is responsible for constructing an environment 140 in which the software module under analysis 150 may be tested. A software module, such as the software module 150, may be any type of software component, including but not limited to a function, a procedure, a class, an object, a library, etc. The environment 140 may contain one or more drivers 141 or one or more stubs 142. The irrelevancy analysis component 120 is responsible for determining the relevant and irrelevant, with respect to branch coverage, input data to the software module 150. Since irrelevant values do not influence any branching through the module under analysis, the irrelevant input data are assigned one single value, which can be default concrete values. The relevant input data influence branch coverage. To produce as much as 100% branch coverage for the module under analysis, all relevant data values are assigned symbolic values. The symbolic execution component 130 is responsible for calculating a set of concrete values for each of the relevant input data to the software module 150, which has been assigned a symbolic value. The environment 140 is enhanced such that the relevant input data to the software module 150 have concrete values calculated by the symbolic execution component 130 and the irrelevant input data to the software module 150 have default concrete values. The enhanced environment enables module analysis to produce as much as 100% branch coverage of the module code. Each of the components in the system 100 is described in more detail below.

Communications among the various components in the system 100 may be based on any protocol. In particular embodiments, data that are passed among different components may be represented using XML (Extensible Markup Language). For example, the irrelevancy analysis component 120 may indicate relevant inputs and irrelevant inputs using XML. Similarly, the symbolic execution component 130 may represent concrete values calculated for the relevant inputs using XML and forward the concrete values in XML format to the environment 140.

Software systems have grown steadily in complexity. As a result, most modern software designs follow a modular approach. A software system is divided into multiple interacting modules that at the same time are relatively self-contained. Typically, a module contains encapsulated data and procedures grouped together to represent an entity or perform a task. The module interface defines how the modules may be used by other components.

Figure 2:
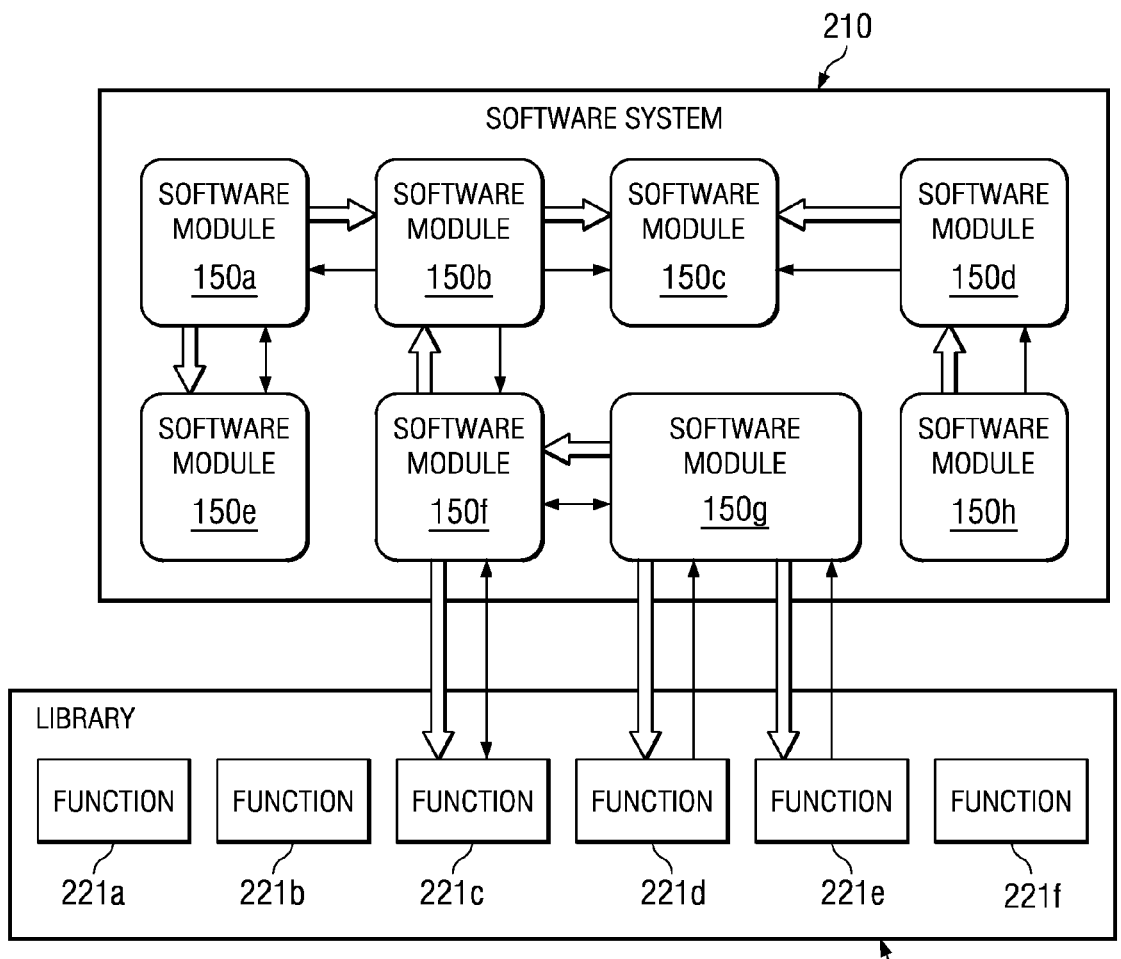
FIG. 2 illustrates example software including multiple software modules.

FIG. 2 illustrates an example software system 210 that contains eight software modules, the software modules 150a-150h. One or more software modules may interact with one or more other software modules. For example, with the computer system 210, the software module 150a may invoke the software module 150b and the software module 150e (depicted by thick arrows); the software module 150b and the software module 150d both invoke the software module 150c; and so on. When a first module invokes a second module, the first module may send one or more pieces of input data to the second module, or receive one or more pieces of output data, e.g., return values, from the second module, or both (depicted by thin arrows). The input and output data being passed back and forth between two interacting modules are defined by the module interface. Again, with the software system 210, when the software module 150a invokes the software module 150e, the software module 150a both sends input data to and receives output data from the software module 150e. On the other hand, when the software module 150a invokes the software module 150b, the software module 150a does not send any input data to the software module 150b but only receives output data from the software module 150b. Conversely, when the software module 150b invokes the software module 150c, the software module 150b only sends input data to the software module 150c but does not receive any output data from the software module 150c.

Often, a computer system functions, e.g., is executed, over a platform that may include one or more software libraries. Similar to the computer system, a platform library is usually divided into functional units, e.g., functions. In FIG. 2, the computer system 210 is executed over a library 220 that includes six functions, the functions 221a-221f. The library 220 provides functional support to the computer system 210. In addition to interacting with each other, some of the modules in the computer system 210 may interact with some of the library functions in the library 220. Typically, a module may invoke a library function to perform a certain task.

A module interacts with a library function in the similar fashion as it interacts with another module within the same computer system. In this regard, a library function may be considered another module, except that the library function is outside of the computer system in question. When a module invokes a library function, the module may send one or more pieces of input data to the library function, or receive one or more pieces of output data from the library function, or both. In FIG. 2, for example, the software module 150f invokes the function 221c and both sends input data to and receives output data from the function 221c; the software module 150g invokes the function 221d and the function 221e and receives output data from both the function 221d and the function 221e.

Although the present disclosure describes and illustrates an example software system 210, the present disclosure contemplates any suitable software systems 210 with any suitable software modules and any suitable library 220 or similar components.

Analyzing the software system 210, consisting of multiple modules, may be difficult due to scalability issues. Instead, individual modules in the system may be analyzed, e.g., checked, separately. Suppose the software module 150f of the computer system 210 is to be tested and validated by itself in isolation. First, it is necessary to construct an environment in which the software module 150f may be executed and tested. The environment model simulates the actual environment, e.g., the compute system 210 and the library 220, in which the software module 150f normally functions.

Figure 3:
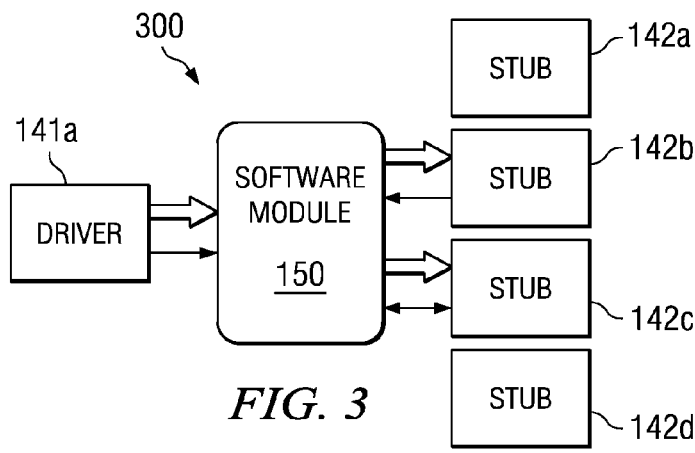
FIG. 3 illustrates an example environment for modular software analysis.

In this example, the software module 150f interacts with modules 150b and 150g and the function 221c. Thus, the test environment needs to preserve these interactions. FIG. 3 illustrates an example environment 300 for performing modular analysis of a software module 150, such as any of the modules in the software system 210.

In particular embodiments, an environment may include one or more drivers or one or more stubs. A driver simulates a module that invokes the module under analysis and sends test values as input data to the module under analysis. A stub simulates a module or function that is invoked by the module under analysis and returns test values as the stub's output data to the module under analysis. In other words, the module under analysis receives a stub's output data from the stub. Note that with respect to the module under analysis, both drivers and stubs may pass test values as input data to it. More specifically, when a driver invokes the module under analysis, it may pass test values as input data to the module. When the module under analysis invokes a stub and receives test values as the stub's output data from the stub, the output data from the stub is in fact the input data to the module under analysis.

Since drivers and stubs are simulations of the actual modules and functions, they may not perform any or all of the functionalities implemented by the actual modules and functions they simulate. Instead, the drivers and stubs are responsible for passing various test values to the module under analysis as its input data, with the goal to enable as much as 100% branch coverage of the module code.

The sample environment 300 has one driver, the driver 141a, that invokes the software module 150, e.g., the module under analysis, and four stubs, the stubs 142a-142d. The software module 150 in FIG. 3 may be any one of the software modules illustrated in FIG. 2 of any other types of software modules. In FIG. 2, the software module 150f is invoked by the software module 150g. In particular embodiments, the driver 141a may simulate the software module 150g. On the other hand, the software module 150f may be invoked by any driver that follows the interface definition of the software module 150f, and thus, it is not necessary for the driver 141a to simulate the software module 150g exactly. It may be sufficient that the driver 141a invokes the software module 150f and provides test values as input data to the software module 150f.

In FIG. 2, the software module 150f invokes the software module 150b and the function 221c and receives output data from both the software module 150b and the function 221c. The stub 142b may simulate the software module 150b and the stub 142c may simulate the function 221c. Again, it is not necessary for the stub 142b and the stub 142c to respectively simulate the software module 150b and the function 221c exactly. It may be sufficient that stubs 142b and 142c provide test values as return input data to the software module 150f.

Environment 300 may include additional drivers or stubs, e.g., the stubs 142a and 142d, with which the module under analysis, the software module 150, does not interact. These drivers or stubs may be ignored if not used for the analysis of a particular module. An environment may be generated for one or more specific modules being analyzed. Different environments may be constructed for different modules under analysis. In addition, multiple modules may be analyzed together.

In particular embodiments, the relevancy of every input variable in the software module under analysis with respect to branch coverage is determined using static analysis, and more specifically, irrelevancy analysis. Static analysis, or more precisely, static code analysis, is the analysis of computer software that is performed without actually executing the binary code built from the software's source code. In most cases, static code analysis is performed on the source code of the software. However, in some cases, static code analysis may be performed on the object code of the software.

In particular embodiments, the specific form of static code analysis performed on the module under analysis is irrelevancy analysis. For every input variable in the module under analysis, e.g. a variable that receives test value(s) from either a driver or a stub, the irrelevancy analysis determines whether the variable affects a branching operation in the module. In software programming, a branching operation refers to a section of the code that may proceed along two or more different execution paths, e.g., branches, depending on whether one or more conditions are satisfied. If an input variable affects a branching operation, e.g., different values of the variable causing the module to proceed along different paths, then the variable is considered a relevant variable with respect to branch coverage of the module. On the other hand, if an input variable does not affect a branching operation, e.g., the module proceeds along the same execution path regardless of the actual values of the variable, then the variable is considered an irrelevant variable with respect to branch coverage of the module.

To further explain the irrelevancy analysis, consider the following short piece of software source code illustrated in TABLE 1. This source code may be the source code of the software module under analysis. Although the code is represented using the Java programming language, one skilled in the art will understand that the same analysis applies regardless of the actual computer programming language used to code the software module under analysis.

TABLE 1

Sample Source Code "passwordVerification"

| 1 | boolean passwordVerification( |
| 2 | String username, String password) { |
| 3 | String pw; |
| 4 | pw = retrievePassword(username); |
| 5 | if (password == pw) { |
| 6 | return true; |
| 7 | } else { |
| 8 | return false; |
| 9 | } |
| 10 | } |

The method "passwordVerification" verifies a password entered by a user for a username against the password stored in the system for that username. It is typically invoked when a user logins onto a system that requires a username and a password. There are three input variables of the type String in this method: "username," "password," and "pw." The values for "username" and "password" are passed to the method "passwordVerification" by the method that invokes the method (line 2), and the value for "pw" is passed to the method "passwordVerification" by another method, "retrievePassword," as a return value when the method "passwordVerification" invokes the method "retrievePassword" (line 4). The method "retrievePassword" retrieves and returns the password stored in the system for a given username, which is used to compare against the password the user has just entered for verification.

The branching operation in the method "passwordVerification" is the "if" statement (lines 5-9). If the password entered by the user matches the password stored in the system (line 5), e.g., "password=pw," then the method returns "true" (line 6), which indicates that the user has entered the correct password. Otherwise, if the password entered by the user does not match the password stored in the system (line 7), the method returns "false" (line 8), which indicates that the user has entered the incorrect password.

In the method "passwordVerification," all three input variables, "username," "password," and "pw," directly or indirectly affect the branching operation. The values of "password" and "pw" directly determine whether the condition of the "if" statement is satisfied, and thus which branch of the "if" statement to execute. The value of "username" determines the value of "pw" retrieved from the system using the method "retrievePassword" because different values for "username" result in different values for "pw" being retrieved from the system, which in turn affect the condition of the "if" statement and the branch to execute. Therefore, the irrelevancy analysis considers all three input variables as relevant variables because their values affect the branching operation in this method.

Consider another piece of software source code illustrated in TABLE 2.

TABLE 2

Sample Source Code "passwordUpdate"

| 1 | boolean passwordUpdate( |
| 2 | String username, String password) { |
| 3 | if (password == null) { |
| 4 | logger.error("null value"); |
| 5 | return false; |
| 6 | } |
| 7 | if(password.length( ) < 6){ |
| 8 | logger.error("must be at least 6 characters"); |
| 9 | return false; |
| 10 | } |
| 11 | storePassword(username, password); |
| 12 | return true; |
| 13 | } |

The method "passwordUpdate" modifies a password stored in the system for a username by replacing the old password with a new password. It is typically invoked when a user wishes to change his or her password. There are two input variables of the type String in this method: "username" and "password." The values for "username" and "password" are passed to the method "passwordUpdate" by a method that invokes it (e.g., as part of a test driver).

The "passwordUpdate" method contains two "if" statements (lines 3-6 and 7-10). The password stored in the system is updated only if the user has entered a valid new password, i.e., a password that is not "null" and is at least 6 characters long. If the value of the new password passes two checks, then the method invokes another method, "storePassword," to store the new password in the system for "username" (line 11). The method returns "true" (line 12) to indicate that the password has been successfully updated. Otherwise, if the value of the new password is "null" or a string with less than 6 characters, then the method returns "false" (lines 5, 9) to indicate that the password has not been successfully updated.

In the method "passwordUpdate," only the input variable "password" affects the branching operations. The value of "password" determines whether the conditions of the "if" statements are satisfied and thus which branch of the "if" statements to execute. The value of "username," although is used in the method (line 11), does not affect which branch of the "if" statements to proceed. Therefore, the irrelevancy analysis considers "password" as a relevant variable because its value affects the branching operations in this method, but "username" as an irrelevant variable because its value does not affect the branching operations in this method.

In particular embodiments, all irrelevant input variables are assigned default concrete values and all relevant input variables are assigned symbolic values. A concrete value is an actual number, character, or string, true/false, an array of numbers, etc. The default concrete value assigned to an irrelevant variable may depend on the type of the variable. For example, an irrelevant variable of the type "Int" (integer) or "Float" may be assigned 0 as its default concrete value; an irrelevant variable of the type "boolean" may be assigned "true" as its default concrete value; an irrelevant variable of the type "String" or "Object" may be assigned "null" as its default concrete value; and so on.

Each relevant input variable is assigned a symbol as its value. For example, Symbolic.SymString and Symbolic.SymInt can be used to denote a symbolic string and a symbolic integer value in a Java program. A symbolic value assigned to a relevant variable may represent any possible value that the variable may legally have based on its type. For example, an integer variable may legally have any integer number as its value.

TABLE 3 shows an example of a driver for the method "updatePassword" shown in TABLE 2. Initially, both "user" and "password" are assigned a symbolic value. After the irrelevancy analysis stage, the value of the "user" is assigned to a default value, "null." The remaining symbolic value is then treated by symbolic execution to calculate concrete values for "password" to maximize the branch coverage of the "updatePassword" method.

TABLE 3

Sample Driver Source Code

| | |
|---|---|
| 1 | void testPasswordUpdate( ) { |
| 2 | String user = null; |
| 3 | String password = Symbolic.SymString; |
| 4 | passwordUpdate(user, password); |
| 5 | } |

In particular embodiments, symbolic execution is a formal software testing technique that is derived from symbolic computation, which uses machines, such as computers, to manipulate mathematical equations and expressions in symbolic form. As applied to software testing, symbolic execution may be used to analyze if and when errors in the source code of a piece of computer software may occur, predict what code statements do to specified inputs and outputs, and consider path traversal within the piece of software.

Symbolic execution is a non-explicit state model checking technique that treats input variables to a piece of software as symbols. It then creates complex equations by executing all possible finite paths in the program with the symbolic variables. These equations are then solved through a solver, which is referred to as a decision procedure, to obtain error scenarios, if any. Symbolic execution is able to reason about all possible values using a symbolic input and all possible scenarios in which that symbolic value may be used in the piece of software under analysis.

To symbolically execute a piece of software, symbols representing arbitrary values replace normal input values, such as numbers, strings, boolean, etc., to the piece of software. The operations used to manipulate such variables are replaced with symbolic versions of the operations so that they can manipulate symbolic formulas instead of concrete values. The piece of software is then executed as in a normal execution. The variables usually take symbolic formulas instead of actual values. Systematic analysis may then be performed on the symbolic formulas to validate and verify requirement properties on the software.

Performing symbolic execution on a software module may yield concrete values for the symbolic variables in the module. These values are designed to test the validity of the module and expose potential errors in the module. Recall that irrelevancy analysis has been performed on the software module under analysis, e.g., the software module 150 in FIG. 1 or FIG. 3, to determine the relevant and irrelevant input data to the module under analysis. Each of the irrelevant input data has been assigned a default concrete value and each of the relevant input data has been assigned a symbolic value.

By performing symbolic execution of the module under analysis, a set of concrete values may be calculated for each of the relevant input data that has initially been assigned a symbolic value. The concrete values are selected such that they may help test the validity of the module under analysis, such as whether the module satisfy the specification requirements or to maximize branch coverage of the module code. In particular embodiments, for each of the relevant input data, its corresponding set of concrete values includes different values that, when passed to the software module under analysis during its execution, would cause the software module to proceed along different paths at the branching operation affected by the relevant input data. In fact, to completely test the software module, for each of the relevant input data, its corresponding set of concrete values, when passed to the software module one at a time during the execution of the software module, would cause the software module to proceed along each and every one of the possible paths at the branching operation affected by the relevant input data, thus producing as much as 100% branch coverage of the module code.

To further explain symbolic execution, consider the code in TABLE 2 and the sample driver in TABLE 3. Symbolic execution executes the driver with a symbolic value assigned to the "password" variable. For each if statement condition, symbolic execution creates 2 path conditions: one for the true branch and one for the false branch. For the "passwordUpdate" method, symbolic execution calculates the following path conditions: (1) for the true branch of the first if statement to execute, "password==null" is true; (2) for the false branch of the first if statement, "password!=null" is true; (3) for the true branch of the second if statement, "password!=null" and "password.length( )<6" are true; and (4) for the false branch of the second if statement, "password!=null" and "password.length( )>=6" are true. Based on the above path conditions, symbolic execution generates a concrete value for the "password" to make each branch executable by the driver.

TABLE 4 shows an enhanced driver based on values calculated by symbolic execution. The following concrete values can be generated by the symbolic execution: (1) "null" (line 3), based on the path condition "password==null"; (2) empty string " " (line 9), based on the path condition "password!=null"; (3) "abcde" (line 12), based on the path conditions "password!=null" and "password.length( )<6"; and (4) "abcdef" (line 15), based on the path conditions "password!=null" and "password.length( )>=6". The enhanced driver is implemented to pick each concrete value in turn (lines 3, 9, 12, and 15) and invoke the method under test with that value. TABLE 4 shows one way to implement such a driver. The test cases are enclosed with a switch statement, with each "case" statement assigning a specific test value to the variable "password". A special modeling primitive "choose (4)" (line 4) is used to force an underlying analysis (e.g., model checking) to explore all possible integer values from 1 to 4. Then, each of the cases of the switch statement is explored by the analysis. In other words, the driver invoked the "passwordUpdate" method 4 times, each time with a different set of concrete values for the "password" variable. This driver produces 100% coverage over the code of the "passwordUpdate" method in this particular embodiment.

TABLE 4

Enhanced Sample Driver Source Code

```
1    void testPasswordUpdate( ) {
2      String user = null;
3      String password = null;
4      int choice = Verify.choose(4)
5      switch(choice){
6        case 1:
7          break;
8        case 2:
9          password = "";
10         break;
11       case 4:
12         password = "abcde";
13         break;
14       case 4:
15         password = "abcdef";
16         break;
17     }
18     passwordUpdate(user, password);
19   }
```

There are various implementation approaches to symbolic execution. Different embodiments may use different implementations of symbolic execution, including existing implementations and models.

Once a set of concrete values has been calculated for each of the relevant input data to the module under analysis, the environment constructed, e.g., the environment 140, for the module under analysis, e.g., the software module 150, may be enhanced such that the drivers or the stubs pass default concrete values to the irrelevant input data and concrete values calculated by the symbolic execution to the relevant input data of the module under analysis.

Figure 4:
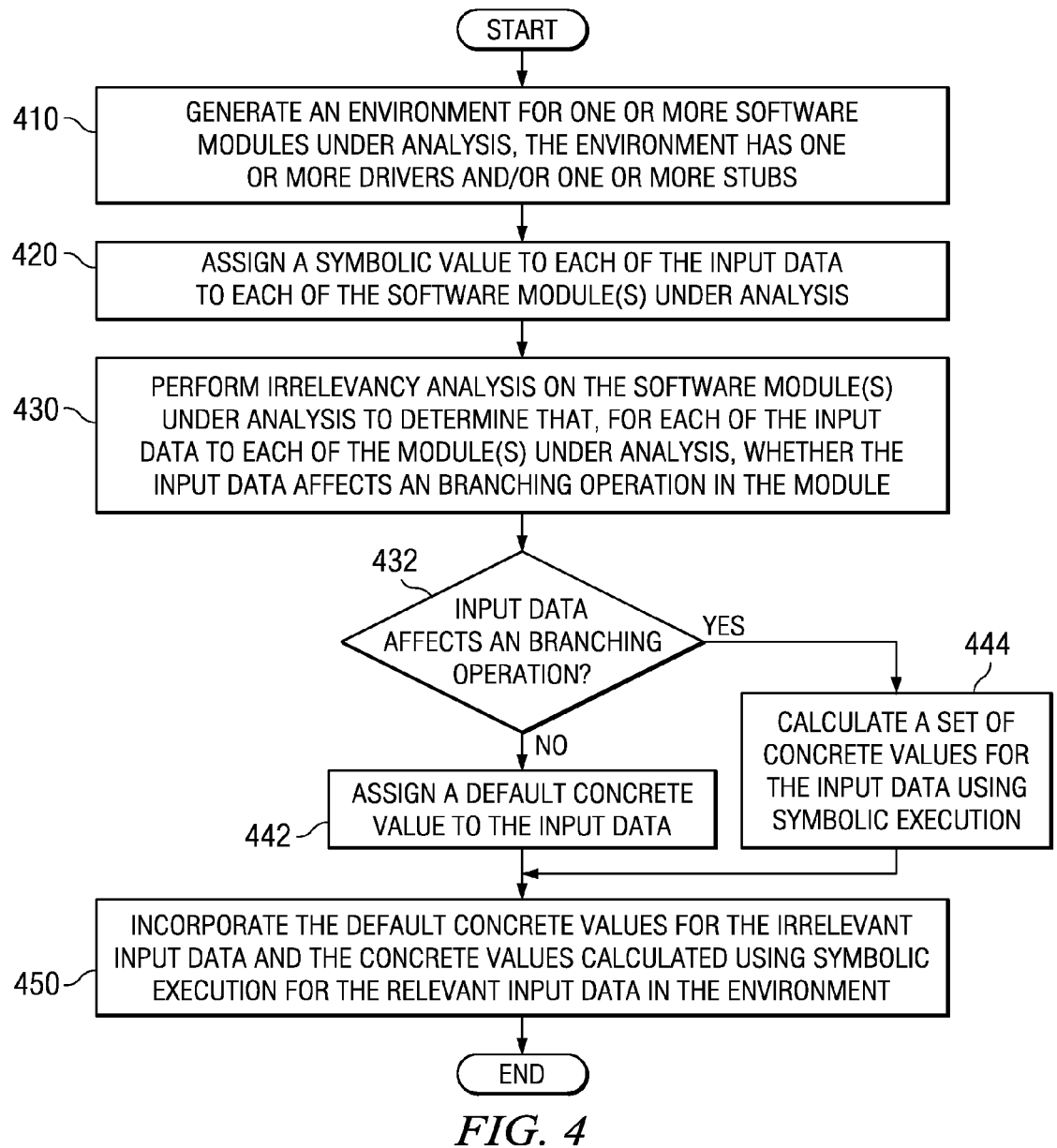
FIG. 4 illustrates an example method for refining environment data for modular software analysis.

FIG. 4 illustrates an example method for refining environment data for modular software analysis. An environment is generated for one or more software modules under analysis (step 410). The environment contains one or more drivers or one or more stubs that pass input data to the software module(s) under analysis. Initially, each of the input data to the software module(s) under analysis is assigned a symbolic value (step 420).

Irrelevancy analysis is performed on the software module(s) under analysis to determine that, for each of the input data to each of the software module(s) under analysis, whether the input data affects a branching operation in the module (step 430). If the input data affects a branching operation in the module, then the input data is considered relevant with respect to branch coverage of the module code. Conversely, if the input data does not affect any branching operation in the module, then the input data is considered irrelevant with respect to branch coverage of the module code.

If the input data does not affect any branching operation in the module (step 432), e.g., a piece of irrelevant input data, then the input data is assigned a default concrete value (step 442). On the other hand, if the input data affects a branching operation in the module (step 432), e.g., a piece of relevant input data, then a set of concrete values is calculated for the input data using symbolic execution (step 444).

The environment is enhanced such that for the irrelevant input data to the module(s) under analysis, the driver(s) or the stub(s) pass default concrete values to the module(s) under analysis, and for the relevant input data to module(s) under analysis, the driver(s) or the stub(s) pass sets of concrete values calculated using symbolic execution to the module(s) under analysis (step 450). The module(s) under analysis may then be analyzed in the enhanced environment.

Although the present disclosure describes and illustrates particular steps of the method of FIG. 4 occurring in a particular order, the present disclosure contemplates any suitable steps of the method of FIG. 4 occurring in any particular order. Moreover, although the present disclosure describes and illustrates particular components carrying out particular steps of the method of FIG. 4, the present disclosure contemplates any suitable components carrying out any suitable steps of the method of FIG. 4.

Figure 5:
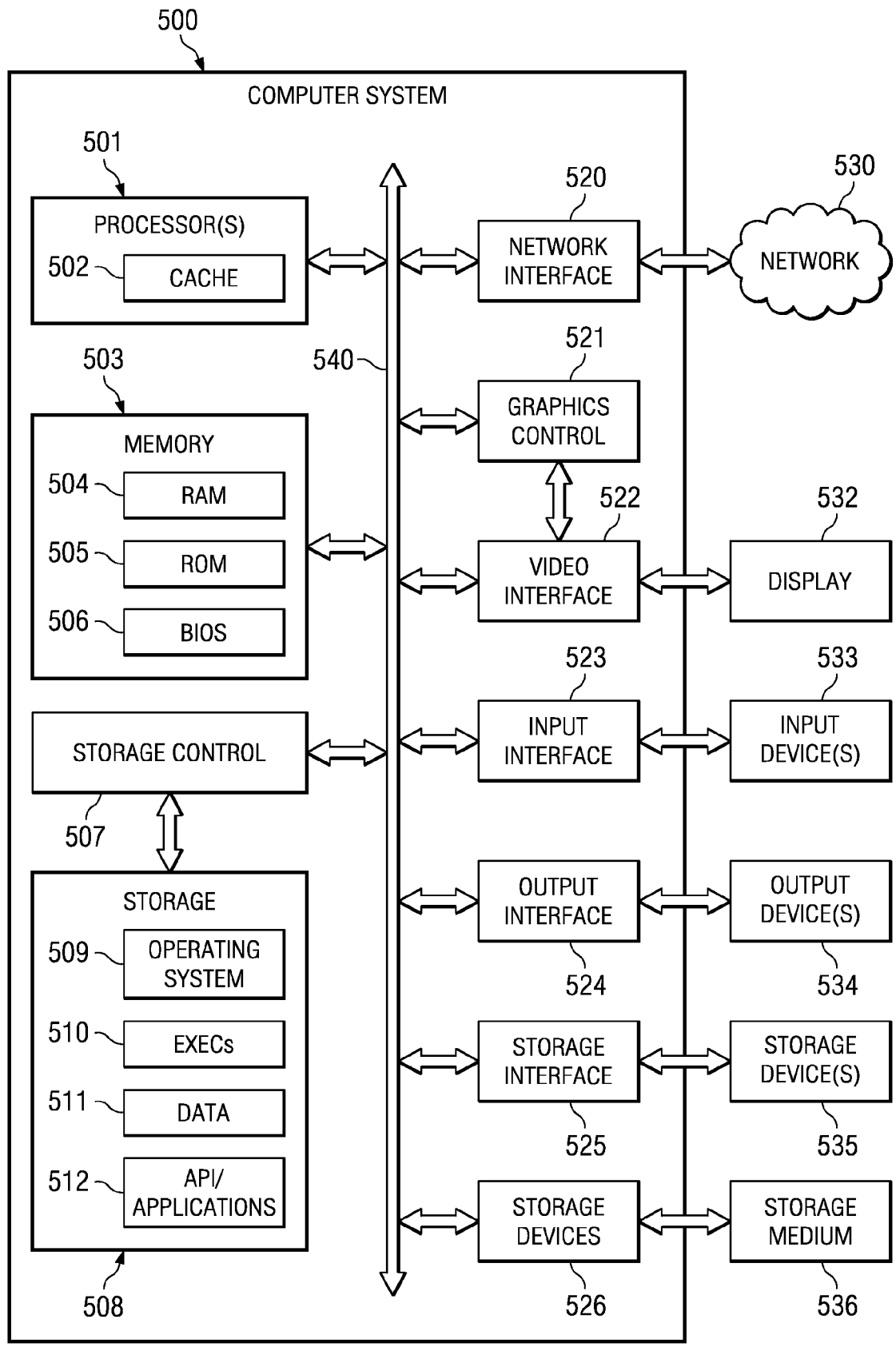
FIG. 5 illustrates an exemplary architecture of an example computer system.

The method described above may be implemented as computer software using computer-readable instructions and stored in computer-readable medium. The software instructions may be executed on various types of computers. For example, FIG. 5 illustrates a computer system 500. The components shown in FIG. 5 for computer system 500 are exemplary in nature and are not intended to suggest any limitation as to the scope of use or functionality of the API. Neither should the configuration of components be interpreted as having any dependency or requirement relating to any one or combination of components illustrated in the exemplary embodiment of a computer system. The computer system 500 may have many physical forms including an integrated circuit, a printed circuit board, a small handheld device (such as a mobile telephone or PDA), a personal computer or a super computer.

Computer system 500 includes a display 532, one or more input devices 533 (e.g., keypad, keyboard, mouse, stylus, etc.), one or more output devices 534 (e.g., speaker), one or more storage devices 535, various types of storage medium 536.

The system bus 540 links a wide variety of subsystems. As understood by those skilled in the art, a "bus" refers to a plurality of digital signal lines serving a common function. The system bus 540 may be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 501 (also referred to as central processing units, or CPUs) optionally contain a cache memory unit 502 for temporary local storage of instructions, data, or computer addresses. Processor(s) 501 are coupled to storage devices including memory 503. Memory 503 includes random access memory (RAM) 504 and read-only memory (ROM) 505. As is well known in the art, ROM 505 acts to transfer data and instructions uni-directionally to the processor(s) 501, and RAM 504 is used typically to transfer data and instructions in a bi-directional manner. Both of these types of memories may include any suitable of the computer-readable media described below.

A fixed storage 508 is also coupled bi-directionally to the processor(s) 501, optionally via a storage control unit 507. It provides additional data storage capacity and may also include any of the computer-readable media described below. Storage 508 may be used to store operating system 509, EXECs 510, application programs 512, data 511 and the like and is typically a secondary storage medium (such as a hard disk) that is slower than primary storage. It should be appreciated that the information retained within storage 508, may, in appropriate cases, be incorporated in standard fashion as virtual memory in memory 503.

Processor(s) 501 is also coupled to a variety of interfaces such as graphics control 521, video interface 522, input interface 523, output interface, storage interface, and these interfaces in turn are coupled to the appropriate devices. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 501 may be coupled to another computer or telecommunications network 530 using network interface 520. With such a network interface 520, it is contemplated that the CPU 501 might receive information from the network 530, or might output information to the network in the course of performing the above-described method steps. Furthermore, method embodiments of the present disclosure may execute solely upon CPU 501 or may execute over a network 530 such as the Internet in conjunction with a remote CPU 501 that shares a portion of the processing.

In particular embodiments, when in a network environment, e.g., when computer system 500 is connected to network 530, computer system 500 may communicate with other devices that are also connected to network 530. Communications may be sent to and from computer system 500 via network interface 520. For example, incoming communications, such as a request or a response from another device, in the form of one or more packets, may be received from network 530 at network interface 520 and stored in selected sections in memory 503 for processing. Outgoing communications, such as a request or a response to another device, again in the form of one or more packets, may also be stored in selected sections in memory 503 and sent out to network 530 at network interface 520. Processor(s) 501 may access these communication packets stored in memory 503 for processing.

In addition, embodiments of the present disclosure further relate to computer storage products with a computer-readable medium that have computer code thereon for performing various computer-implemented operations. The media and computer code may be those specially designed and constructed for the purposes of the present disclosure, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

As an example and not by way of limitation, the computer system having architecture 500 may provide functionality as a result of processor(s) 501 executing software embodied in one or more tangible, computer-readable media, such as memory 503. Software implementing particular embodiments may be stored in memory 503 and executed by processor(s) 501. A computer-readable medium may include one or more memory devices, according to particular needs. Memory 503 may read the software from one or more other computer-readable media, such as mass storage device(s) 535 or from one or more other sources via communication interface. The software may cause processor(s) 501 to execute particular processes or particular steps of particular processes described herein, including defining data structures stored in memory 503 and modifying such data structures according to the processes defined by the software. In addition or as an alternative, the computer system may provide functionality as a result of logic hardwired or otherwise embodied in a circuit, which may operate in place of or together with software to execute particular processes or particular steps of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method executed by at least one central processing unit (CPU) comprising:

for each of at least one input to a computer software module, performing static code analysis, by the at least one CPU, to determine whether the input is relevant or irrelevant to validation of the computer software module, wherein:

an input is relevant to the validation of the computer software module when different values of the input cause at least one portion of the computer software module to branch differently;

an input is irrelevant to the validation of the computer software module when different values of the input do not cause any portion of the computer software module to branch differently; and the static code analysis is performed without executing the computer, software module;

assigning, by the at least one CPU, a default concrete value to each irrelevant input among the at least one input to the computer software module;

determining, by the at least one CPU, a set of concrete values for each relevant input among the at least one input to the computer software module;

modeling an execution environment for the computer software module;

for each irrelevant input to the computer software module, communicating its assigned default concrete value for input to the computer software module when the computer software module is executed within the modeled execution environment; and for each relevant input to the computer software module, communicating its determined set of concrete values for input to the computer software module when the computer software module is executed within the modeled execution environment.

2. The method of claim 1, wherein, for each relevant input among the at least one input to the computer software module, different values from its determined set of concrete values cause at least one portion of the computer software module to branch differently when the computer software module is executed within the modeled execution environment.

3. The method of claim 2, wherein, for each relevant input among the at least one input to the computer software module, its determined set of concrete values includes values that cause the at least one portion of the computer software module to proceed along all possible branches when the computer software module is executed within the modeled execution environment.

4. The method of claim 1, wherein the relevant and irrelevant inputs among the at least one input to a computer software module are determined using irrelevancy analysis.

5. The method of claim 1, wherein the set of concrete values for each relevant input among the at least one input to the computer software module is determined using symbolic analysis.

6. The method of claim 5, wherein determining a set of concrete values for each relevant input among the at least one input to the computer software module comprises:

assigning a symbolic value to each relevant input among the at least one input to the computer software module;

performing symbolic execution on the computer software module; and calculating the set of concrete values for each relevant input among the at least one input based on results of the symbolic execution.

7. The method of claim 1, wherein:

the environment comprises at least one driver or at least one stub; and selected ones of the at least one driver or the at least one stub pass concrete values to selected ones of the at least one input to the computer software module.

8. The method of claim 7, further comprising:

executing the computer software module in the environment; and validating the computer software module based on results of the execution.

9. The method of claim 8, wherein, during the execution of the computer software module in the environment, selected ones of the at least one driver or the at least one stub pass the corresponding default concrete value to each irrelevant input and the corresponding set of concrete values to each relevant input among the at least one input to the computer software module.

10. The method of claim 1, wherein the computer software module is a part of a computer system that comprises a plurality of computer software modules, and wherein selected ones of the plurality of computer software modules interact with each other.

11. A system comprising:

a memory storage unit storing a computer software module; and at least one computer processing unit (CPU) having access to the memory storage unit, the CPU comprising:

an environment generation component configured to construct an environment for the computer software module that is suitable for performing modular software analysis on the computer software module;

an irrelevancy analysis component configured to perform static code analysis to determine which input among at least one input to the computer software module is irrelevant input and which input among the at least one input is relevant input with respect to branch coverage of the computer software module, wherein an input is relevant to the validation of the computer software module when different values of the input cause at least one portion of the computer software module to branch differently;

an input is irrelevant to the validation of the computer software module when different values of the input do not cause any portion of the computer software module to branch differently; and the static code analysis is performed without executing the computer software module; and a symbolic execution component configured to perform symbolic execution on the computer software module to calculate a set of concrete values for each relevant input among the at least one input to the computer software module.

12. A system as recited in claim 11, wherein an input is relevant to branch coverage of the computer software module when different values of the input cause at least one portion of the computer software module to branch differently, and wherein an input is irrelevant to branch coverage of the computer software module when different values of the input do not cause any portion of the computer software module to branch differently.

13. A system as recited in claim 12, wherein an input is relevant to branch coverage of the computer software module when different values of the input directly cause at least one portion of the computer software module to branch differently.

14. A system as recited in claim 12, wherein an input is relevant to branch coverage of the computer software module when different values of the input indirectly cause at least one portion of the computer software module to branch differently.

15. A system as recited in claim 11, wherein the irrelevancy analysis component is further configured to assign a default concrete value to each irrelevant input among the at least one input to the computer software module.

16. A system as recited in claim 15, wherein the environment generation component is further configured to assign a symbolic value to each relevant input among the at least one input to the computer software module.

17. A system as recited in claim 15, wherein the environment comprises at least one driver or at least one stub, and wherein selected ones of the at least one driver or the at least one stub pass concrete values to selected ones of the at least one input to the computer software module.

18. A system as recited in claim 17, wherein the environment generation component is further configured to provide appropriate concrete values to selected ones of the at least one driver or the at least one stub of the environment, such that during execution of the computer software module in the environment, selected ones of the at least one driver or the at least one stub pass the corresponding default concrete value to each irrelevant input and the corresponding set of concrete values to each relevant input among the at least one input to the computer software module.

19. One or more non-transitory computer-readable tangible media embodying software that when executed by one or more computer systems is operable to:
for each of at least one input to a computer software module, perform static code analysis to determine whether the input is relevant or irrelevant to validation of the computer software module, wherein:
an input is relevant to the validation of the computer software module when different values of the input cause at least one portion of the computer software module to branch differently;
an input is irrelevant to the validation of the computer software module when different values of the input do not cause any portion of the computer software module to branch differently; and
the static code analysis is performed without executing the computer software module;
assign a default concrete value to each irrelevant input among the at least one input to the computer software module;
determine a set of concrete values for each relevant input among the at least one input to the computer software module; and
model an execution environment for the computer software module;
for each irrelevant input to the computer software module, communicate its assigned default concrete value for input to the computer software module when the computer software module is executed within the modeled execution environment; and
for each relevant input to the computer software module, communicate its determined set of concrete values for input to the computer software module when the computer software module is executed within the modeled execution environment.

20. The non-transitory computer-readable tangible media of claim 19, wherein, for each relevant input among the at least one input to the computer software module, different values from its determined set of concrete values cause at least one portion of the computer software module to branch differently when the computer software module is executed within the modeled execution environment.

21. The non-transitory computer-readable tangible media of claim 20, wherein, for each relevant input among the at least one input to the computer software module, its determined set of concrete values includes values that cause the at least one portion of the computer software module to proceed along all possible branches when the computer software module is executed within the modeled execution environment.

22. The non-transitory computer-readable tangible media of claim 19, wherein the relevant and irrelevant inputs among the at least one input to a computer software module are determined using irrelevancy analysis.

23. The non-transitory computer-readable tangible media of claim 19, wherein the set of concrete values for each relevant input among the at least one input to the computer software module is determined using symbolic analysis.

24. The non-transitory computer-readable tangible media of claim 23, wherein to determine a set of concrete values for each relevant input among the at least one input to the computer software module comprises:
assign a symbolic value to each relevant input among the at least one input to the computer software module comprises;
perform symbolic execution on the computer software module; and
calculate the set of concrete values for each relevant input among the at least one input based on results of the symbolic execution.

25. The non-transitory computer-readable tangible media of claim 19, wherein:
the environment comprises at least one driver or at least one stub; and
selected ones of the at least one driver or the at least one stub pass concrete values to selected ones of the at least one input to the computer software module.

26. The non-transitory computer-readable tangible media of claim 25, wherein the software is further operable to:
execute the computer software module in the environment; and
validate the computer software module based on results of the execution.

27. The computer-readable tangible media of claim 26, wherein, during the execution of the computer software module in the environment, selected ones of the at least one driver or the at least one stub pass the corresponding default concrete value to each irrelevant input and the corresponding set of concrete values to each relevant input among the at least one input to the computer software module.

28. The non-transitory computer-readable tangible media of claim 19, wherein the computer software module is a part of a computer system that comprises a plurality of computer software modules, and wherein selected ones of the plurality of computer software modules interact with each other.

* * * * *